Figure 1:
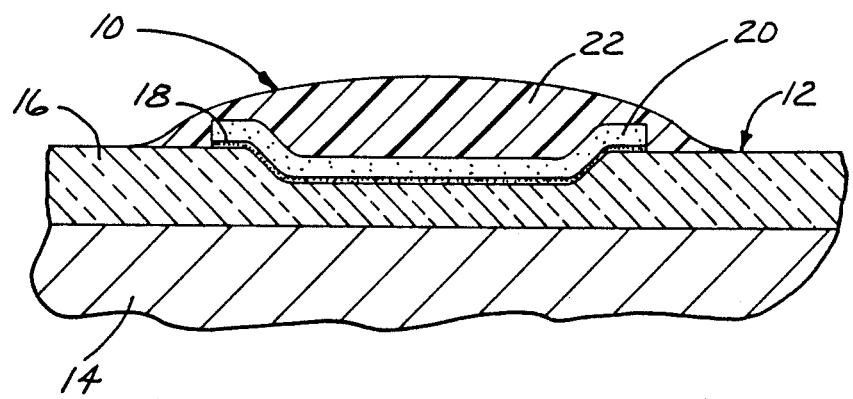

United States Patent [19]

Culler et al.

[11] Patent Number: 4,940,607
[45] Date of Patent: Jul. 10, 1990

[54] METHOD OF PATCHING LINERS OF LARGE GLASS-LINED REACTORS

[75] Inventors: Scott R. Culler; David L. Wakefield, both of St. Paul, Minn.

[73] Assignee: Minnesota Mining and Manufacturing Company, St. Paul, Minn.

[21] Appl. No.: 241,089

[22] Filed: Sep. 6, 1988

[51] Int. Cl.⁵ ............................................. B32B 35/00
[52] U.S. Cl. .................................... 427/140; 427/387; 427/2; 156/94; 264/36; 428/428
[58] Field of Search ............................ 427/140, 387, 2; 428/428; 264/36; 156/94

[56] References Cited

U.S. PATENT DOCUMENTS

| | | | |
|---|---|---|---|
| 4,179,537 | 12/1979 | Rykowski | 427/387 |
| 4,503,169 | 3/1985 | Randklev | 523/117 |
| 4,673,354 | 6/1987 | Culler | 433/217 |
| 4,801,528 | 1/1989 | Bennett | 433/220 |

OTHER PUBLICATIONS

Hackh's Chemical Dictionary, pp. 369, 537, edited by Grant, McGraw-Hill Book Company, 1972.

*Primary Examiner*—Shrive Beck
*Assistant Examiner*—Roy V. King
*Attorney, Agent, or Firm*—Donald M. Sell; Walter N. Kirn; Gerald F. Chernivec

[57] ABSTRACT

Defects in the glass lining of a production-size reactor can be conveniently and inexpensively repaired by (a) applying a thin primer that contains a silane coupling agent, (b) applying a dental composite, and (c) then curing the resin of the composite. This strongly bonds the dental composite to the glass and, when the defect extends to the metal jacket of the reactor, also strongly bonds the composite to the metal. Preferably prior to step (b), the primer is covered by a light-curable adhesive that can covalently bond both to the silane coupling agent of the primer and to the resin of the dental composite. By patching the glass lining in this way, there is little danger of fire or explosion or hazard to the health of the person who applies the patch, and reactor down-time is significantly reduced compared to prior patching methods.

10 Claims, 1 Drawing Sheet

METHOD OF PATCHING LINERS OF LARGE GLASS-LINED REACTORS

BACKGROUND OF THE INVENTION

1. Field of the Invention

The invention concerns a method of patching the lining of a large glass-lined reactor. The novel method can also be used to patch glass in other uses.

2. Description of the widely Related Art

Production-size glass-lined reactors are widely used in the chemical, food processing, and pharmaceutical industries. Among uses in the chemical industry are nitration, halogenation, sulfuration, oxidation, polymerization, and esterification. The reactors are constructed by fusing a glass lining to a steel jacket.

The glass lining can be damaged in a variety of ways such as by thermal stresses or by accidentally rough contact during cleaning. Because a production-size reactor is expensive and because production can be halted for prolonged periods of time if it needs to be replaced, efforts are made to repair any damage on site. It is estimated that on the average, the glass lining of a reactor is repaired 2-3 times per year and that the glass linings of production-size reactors are repaired as many as 20,000 times every year in the United States alone.

Small cracks and pinholes are patched with special resins and cements, typically using repair kits supplied by the reactor manufacturer. The two most widely used kits are called "Furan" and "Silicate" by Pfaudler Division of Standard Oil of Ohio. Similar kits are supplied by De Dietrich of Union N.J.; Ceramic Coating Co. of Newport, N.Y.; A&A Industries; Artisan Industries; Fluidyne Corp.; Tekmar Co.; and Titanium Industries. When a crack or hole extends through the lining to the steel jacket, a repair plug of tantalum or hastalloy can be screwed into the steel jacket to hold a patch in place together with a gasket of porous polytetrafluoroethylene.

All such repairs have short useful lives and sometimes fail almost immediately. Furthermore, the resin or cement kits emit volatiles that could involve danger of explosion. It usually is necessary to take the reactor out of service for from 24 to 48 hours to make a repair with such a kit, although this often is done when the reactor needs cleaning that would require the same amount of down time without any repair.

Another repair technique is to fuse glass over the damaged area, but this requires great skill and can be exceedingly difficult to perform because of poor accessibility to the area needing repair. It also is much more expensive than to use a resin or cement kit or a plug.

OTHER ART

U.S. Pat. No. 4,503,169 (Randklev) discloses dental composite that is a mixture of a polymerizable resin composition and non-vitreous microparticles based on oxide of silicon and polycrystalline ceramic metal oxide. The microparticles preferably have been silane-treated. The dental composite of the Randklev patent can be cured by exposure to a dental curing light.

U.S. Pat. No. 4,673,354 (Culler) discloses a method of priming a dental material (such as dental porcelain, dental alloys, and cured dental composites) using a solution of substantially fully hydrolyzed organofunctional silanol. For example, after a standard dental porcelain has been polished and etched with orthophosphoric acid, a thin layer of silanol priming solution is brushed on and blown dry. This is overcoated with a dental adhesive that is cured by exposure to irradiation from a hand-held dental curing light. Then a dental composite such as that of the Randklev patent is applied over the cured adhesive and cured by the curing light. By virtue of the silanol priming, the dental composite becomes strongly bonded to the dental porcelain.

SUMMARY OF THE INVENTION

The invention provides a convenient, inexpensive method of patching the lining of a glass-lined reactor that significantly reduces down time as compared to prior patching techniques and should provide longer service life. Experiments using the novel patching method have provided a reduction of about 24 hours in the average down times required for repairing production-size reactors of the company to which this application is assigned. The resulting patches have demonstrated excellent resistance to acids, bases, and the high temperatures at which these reactors have been used, better than the resistance of prior patches.

Briefly, the method of the invention involves the steps of
(a) applying to a glass defect a solution of substantially fully hydrolyzed organofunctional silanol and allowing it to dry to provide a thin primer that contains a silane coupling agent,
(b) applying a composite (such as a dental composite) comprising silane-treated ceramic microparticles in a polymerizable resin containing functional groups that can covalently bond to silane, and
(c) then curing the resin of the composite.

This novel method strongly bonds the composite to the glass and, when the defect extends to metal underlying the glass, also strongly bonds the composite to the metal.

Prior to step (a), a bur should be used to form a smooth cavity at the defect. After forming the cavity, the glass at the cavity preferably is etched with an acid such as orthophosphoric acid, both to assure that the glass is clean and to provide greater surface area between the lining and the primer, thus ensuring covalent bonding between surface hydroxyl groups of the lining and silanol groups of the primer.

The patch produced by the novel method is more durable when prior to step (b), an adhesive is applied over the dried primer, which adhesive contains functional groups that can covalently bond both to the silane coupling agent of the primer and to functional groups of the resin of the composite to be applied in step (b). The adhesive should cure to a hydrolytically stable state in order to be resistant to water-based compositions that may be processed in the repaired reactor. Preferably the adhesive is light-curable and is cured prior to step (b) for two reasons. First, if the adhesive were uncured, it might be damaged by the tool with which the composite is applied. Second, when the adhesive is light-curing, the layer of composite applied in step (b) might not be sufficiently translucent to permit the adhesive to become thoroughly cured within a reasonably short period of time.

Preferably the resin of the composite also is light-curable, and neither it nor the adhesive, when used, emits volatiles when cured. Because the primer can be very thin, e.g., 10-300 nm, it dries almost instantaneously and emits very little volatile matter. A preferred primer solution is the silanol priming solution of the above-cited Culler patent (the disclosure of which is incorporated herein by reference).

Because there is almost no evolution of volatiles, the novel method avoids fire, explosion and dangers to the health of the person who applies the patch.

When an adhesive is employed, it preferably is from 15 to 200 μm in thickness. At much less than 15 μm, it might not provide the added durability for which it is used, while it would be wasteful of material if its thickness were substantially in excess of 200 μm.

The thickness of the composite may be from 0.5 to 10 mm. Thicknesses somewhat greater than 0.5 mm tend to provide longer useful life. However, thicknesses greater than about 5 mm provide little improvement in useful life. After the resin of the composite has been cured, the resulting patch should be polished to restore substantially the original contour of the glass lining or other glass article.

DETAILED DISCLOSURE

A preferred composite for use in step (b) is a dental composite of the above-cited Randklev patent, namely, a mixture of a resin composition that polymerizes upon exposure to light and silane-treated ceramic microparticles based on oxide of silicon and polycrystalline ceramic metal oxide. As taught by Randklev (disclosure of which is incorporated herein by reference), polymerizable resins suitable for use in the composite are hardenable organic resins having sufficient strength, hydrolytic stability, and non-toxicity to render them suitable for use in the oral environment. Examples of such resins include acrylate, methacrylate, urethane, and epoxy resins, e.g., those shown in U.S. Pat. Nos. 3,066,112, 3,539,533, 3,629,187, 3,709,866, 3,751,399, 3,766,132, 3,860,556, 4,002,669, 4,115,346, 4,259,117, 4,292,029, 4,308,190, 4,327,014, 4,379,695, 4,387,240, and 4,404,150, and mixtures and derivatives thereof. A preferred polymerizable resin for use in the present invention is a mixture of diglycidylmethacrylate of Bisphenol A (having the formula 2,2-bis[4(2-hydroxy-3-methacryloxypropoxy)phenyl]propane, frequently referred to as "Bis-GMA") and triethyleneglycol dimethacrylate (frequently referred to as "TEGDMA").

As also taught by Randklev, the ceramic microparticles can be obtained from an organic oxide which, when in its pure form, can be fired or sintered into a rigid or self-supporting polycrystalline form that is stable in a normal air environment, e.g., 23° C. and 50 percent relative humidity. Suitable ceramic oxides are non-toxic when incorporated into the microparticle and are colorless or only weakly colored, e.g., BaO, $Bi_2O_3$, CaO, $B_2O_5$, $Sb_2O_5$, $Ta_2O_5$, $TiO_2$, $Y_2O_3$, ZnO, $ZrO_2$, and oxides of the lanthanide series (e.g., $CeO_2$, $Ce_2O_3$ and $La_2O_3$) as well as mixtures and mixed oxides thereof. The microparticles can be silane-treated by known techniques.

Typically the composites contain chemical polymerization initiation systems such as peroxide compounds alone or in combination with suitable amines, sulfur compounds, phosphorous compounds or other chemical compounds capable of reacting with the peroxide to generate free radical species. Alternatively, the composites can contain light-induced polymerization initiation systems such as ketone or alpha-diketone compounds, alone or in combination with suitable amines, peroxides, sulfur compounds, phosphorous compounds, or other chemical compounds capable of reacting with or being sensitized by the ketone or alpha-diketone compounds to effect polymerization of the dental composite resin. The composites can also contain suitable adjuvants such as accelerators, inhibitors, stabilizers, pigments, dyes, viscosity modifiers, extending or reinforcing fillers, surface tension depressants and wetting aids, antioxidants, and other ingredients well known to those skilled in the art.

THE DRAWING

The invention may be more easily understood in reference to the drawing, the single FIGURE of which is a fragmentary schematic cross section through a glass-lined reactor at the site of a patch that has been applied by the method of the invention.

In the drawing, a patch 10 has been applied to a reactor 12 that has a steel jacket 14 and a glass lining 16. A smooth cavity has been formed at a defect in the glass lining. A thin primer 18 has been applied to extend slightly beyond the edges of the cavity, and a layer of adhesive 20 has been applied over the primer. After curing of the adhesive, a composite 22 has been applied over the adhesive. After the composite has been cured, the patch 10 preferably is polished until its surface has the same contour as that of the glass lining 16.

In the examples, all parts are given by weight.

EXAMPLE 1

Using a carbide bur, eight pits (each about 1.5 mm in depth) were ground out of a round glass coupon ("Glasteel" 3300) from Pfaudler to simulate the process of repairing a glass-lined reactor. Each pit was acid etched for 60 seconds with 37% phosphoric acid etchant gel. The etchant gel was removed with a 60-second distilled water rinse and air dried. The glass surface was then primed with Scotchprime TM ceramic primer (from 3M) and allowed to air dry. A TEGDMA/Bis-GMA adhesive (Silux TM enamel bond resin from 3M) was painted over the cured primer and cured for 10 seconds with a Visilux TM 2 curing light (from 3M). Using a spatula, each pit was completely filled with a mixture of silane-treated glass microparticles and a resin composition that polymerizes upon exposure to light (Valux TM dental composite from 3M). This was cured by exposure to the Visilux TM 2 curing light for 60 seconds. The repaired glass coupon was suspended and submerged vertically in a covered glass cylinder that was half filled with 37% hydrochloric acid. After seven days at 90° C., each of the pits was examined visually with results noted at the end of Comparative Examples A and B.

EXAMPLE 2

Eight additional pits in the same glass coupon were filled and tested as in Example 1 except replacing the Valux TM dental composite with P-30 TM dental composite from 3M which also is a mixture of silane-treated glass microparticles and a resin composition that polymerizes upon exposure to light.

COMPARATIVE EXAMPLES A AND B

Sixteen more pits in the same coupon were filled with one of two commercially available reactor-patching products from Pfaudler ("Silicate" and "Furan") according to the manufacturer's directions.

All eight patches of each of Examples 1 and 2 and of Comparative Example A (employing "Silicate" from Pfaudler) showed no change in appearance. All eight patches of Comparative Example B (employing "Furan") fell out during the test.

EXAMPLES 3, 4 AND COMPARATIVE EXAMPLES C and D

A test was performed as in Example 1, except that the bur was used to form a series of four grooves across the glass coupon (each about 5 cm long, 0.75 cm wide, and 2 mm deep) instead of pits. The materials tested were:

For Example 3: the dental composite used in Example 1,

For Example 4: P-50 TM dental composite from 3M which is a mixture of silane-treated ceramic microparticles and a resin composition that polymerizes upon exposure to light, For Comparative Example C: the "Silicate" patching material used in Comparative Example A, and For Comparative Example D: the "Furan" patching material used in Comparative Example B.

The patches of Examples 3 and 4 and Comparative Example D showed no change in appearance upon removing the coupon after five days submersion in 37% HCl at 80° C. in a covered cylinder. The patch of comparative Example C fell out during the test.

The failures of the patches of Comparative Examples B and C can be attributed to the need for very careful mixing and application of these materials unless (as recommended by Pfaudler) they are used with a tantalum patch.

EXAMPLE 5 AND COMPARATIVE EXAMPLES E AND F

A coupon was prepared as in Examples 3 and 4 using materials as follows:

For Example 5: P-50 TM dental composite of Example 4,

For Comparative Example E: "Silicate" patching material of Comparative Example A, and For Comparative Example F: "Furan" patching material of Comparative Example B Except that the coupon had six grooves, and two grooves were patched with each of the three materials. Also, the two patches of Example 5 were polished, first with a coarse abrasive disk and then with a fine abrasive disk to remove flash. There was no flash on the other patches, because the viscosities of those patching materials were much lower than that of Example 5.

The coupon was thermocycled in water between 4° C. and 89° C. with a dwell of 30 seconds at each temperature. After 300 cycles, both "Furan" patches of Comparative Example F had fallen out; both "Silicate" patches of Comparative Example E were pitted and appeared chalky or flaky; both P-50 TM patches of Example 5 were intact with a few hairline cracks. After 1022 cycles, both P-50 TM patches of Example 5 were still intact with some cracks around the edges but otherwise unchanged in appearance; both "Silicate" patches of Comparative Example E were heavily pitted, and areas of rust could be seen on the surface.

EXAMPLE 6 AND COMPARATIVE EXAMPLE G AND H

Two grooves in each of three coupons were patched as in Example 4 except that the P-50 TM dental composite was placed and cured in two layers, instead of one layer, with the first layer filling one-half of the depth of the groove. This minimized shrinkage of the cured material. Two other grooves in each coupon were patched in the same way as Comparative Examples E and F to provide Comparative Examples G and H, respectively.

Each coupon was subjected to one of three corrosive environments for five days:

Condition 1: at least 60° C. while immersed in 1.2% sodium hydroxide (pH about 14);

Condition 2: at least 93° C. while immersed in 85% phosphoric acid;

Condition 3: at least 71° C. while immersed in 37% hydrochloric acid.

Test results are reported in Table I.

TABLE I

| Example | Repair Material | Condition 1 | Condition 2 | Condition 3 |
|---|---|---|---|---|
| 6 | P-50 TM | Intact; second layer cracked after drying | Intact; turned reddish-brown on day 4 | Intact; turned light yellow |
| G | "Silicate" | Dissolved on day 2 | Intact; etched | Intact; rust-colored |
| H | "Furan" | Fell out on day 5 | Disintegrated on day 2 | Intact; darkening of color |

EXAMPLES 7-12

P-50 TM dental composite was used from time to time to repair defects as they appeared in production-size glass-lined reactors that are in daily use, each defect being repaired in the same way as were the pits in Example 1, except as noted. All repairs were still in place and performing satisfactorily on Sept. 6, 1988. The results are shown in Table II.

TABLE II

| Example | Placement Date day/mo/yr | Comments |
|---|---|---|
| 7 | 01/08/87 | Repair of glass near manhole cover, also using a tantalum patch applied as recommended by Pfaudler for its patching materials |
| 8 | 28/10/87 | Repair of 5 pin holes in sidewalls as illustrated in FIG. 1 of the drawing |
| 9 | 13/11/87 | Repair of glass on manhole cover |
| 10 | 24/11/87 | Repair of glass on a space ring |
| 11 | 09/12/87 | Repair of glass on bottom of baffle |
| 12 | 28/04/88 | Repair of 2 spots, one on bottom and one on flush bottom, except that a 650 watt spotlight ("GE Stage Studio Quartz-lined Lamp" No. Q650PAR36/5fBO, 650-watt 120 volt) was used instead of the Visilux TM 2 curing light |

EXAMPLES 13-17

Using a coupon having five grooves as in Examples 3 and 4, each groove was patched with one of five dental composites as indicated below:

| Example | Dental Composite |
|---|---|
| 13 | P-50 TM (hence, a repeat of Example 4) |
| 14 | P-50 TM except omitting the adhesive |
| 15 | "Herculite XR" (Kerr) |
| 16 | "Occlusin" (ICI) |
| 17 | "Prismafil" (Caulk) |

The coupon was thermocycled as in Example 5 except between 10° C. and 50° C. After 500 cycles, there was

We claim:

1. Method of patching a defect in a glass-lined reactor comprising the steps of
   (a) applying to the defect a solution of substantially fully hydrolyzed organofunctional silanol and allowing it to dry to provide a thin primer that contains a silane coupling agent,
   (b) applying a composite comprising silane-treated ceramic microparticles in a polymerizable resin containing functional groups that can covalently bond to silane, and
   (c) then curing the resin of the composite.

2. Method as defined in claim 1 wherein prior to step (b) is the additional step of applying over the primer a light-curable adhesive which contains functional groups that can covalently bond to the silane coupling agent of the primer, said adhesive being capable of curing to a hydrolytically stable state.

3. Method as defined in claim 2 wherein the thickness of the adhesive applied in the additional step is from 15 to 200 μm.

4. Method as defined in claim 3 wherein the adhesive is a light-curable mixture of a bisphenol and a polyfunctional acrylate or methacrylate.

5. Method as defined in claim 4 wherein the bisphenol is 2,2-bis[4(2-hydroxy-3-methacryloxypropoxy)-phenyl]propane.

6. Method as defined in claim 4 wherein the polyfunctional acrylate or methacrylate is triethyleneglycol dimethacrylate.

7. Method as defined in claim 1 wherein the amount of solution applied in step (a) is sufficient to provide a dried primer layer that is 10–300 nm in thickness.

8. Method as defined in claim 1 wherein the thickness of the composite applied in step (b) is from 0.5 to 10 mm.

9. Method as defined in claim 1 including prior to step (a) the step of forming a smooth cavity at said defect.

10. Method as defined in claim 9 including prior to step (a) and after the cavity-forming step the step of etching the glass at the cavity with acid.

* * * * *